(No Model.)
J. W. PATTERSON.
RUNNING GEAR FOR VEHICLES.
No. 460,381. Patented Sept. 29, 1891.
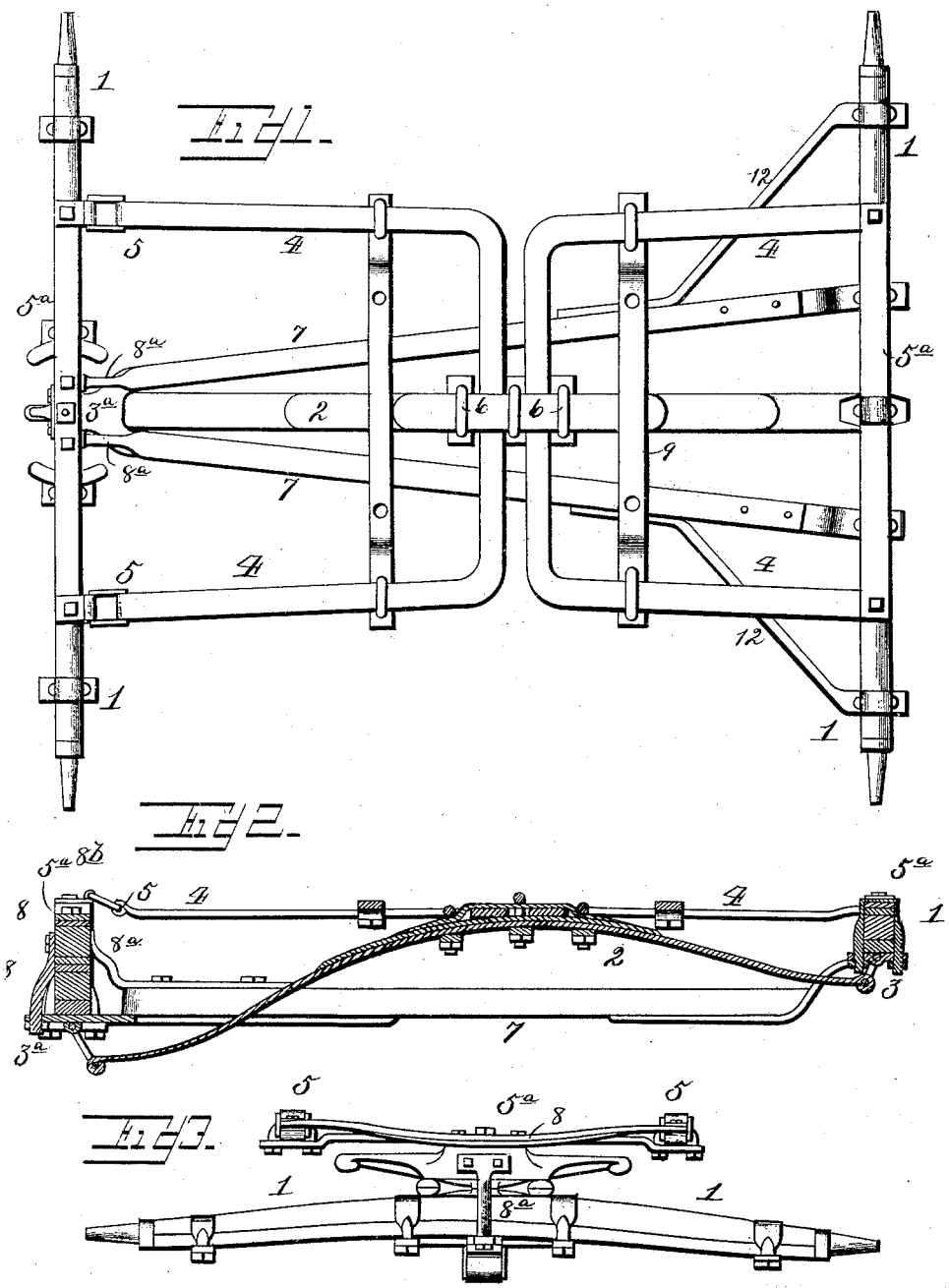
WITNESSES:
INVENTOR:
John W. Patterson,

UNITED STATES PATENT OFFICE.

JOHN W. PATTERSON, OF MADISONVILLE, KENTUCKY.

RUNNING-GEAR FOR VEHICLES.

SPECIFICATION forming part of Letters Patent No. 460,381, dated September 29, 1891.

Application filed May 16, 1891. Serial No. 393,003. (No model.)

*To all whom it may concern:*

Be it known that I, JOHN W. PATTERSON, a citizen of the United States, and a resident of Madisonville, in the county of Hopkins and State of Kentucky, have invented certain new and useful Improvements in Running-Gears for Vehicles; and I do hereby declare that the following is a full, clear, and exact description of the invention, which will enable others skilled in the art to which it appertains to make and use the same, reference being had to the accompanying drawings, which form a part of this specification.

My invention relates to the running-gears of vehicles, and is designed as an improvement on the invention set forth in Letters Patent of the United States granted to me November 18, 1890, No. 440,960.

The said invention consisted in the combination, with the axles and a central spring loosely connected with the axles, of inwardly-projecting springs secured to the axles and to the central spring and provided with transverse bars to which the vehicle-body is secured, and diagonal reach-bars connected with the axles.

The object of the present invention is to improve upon said construction; and it consists in the novel combination of parts hereinafter fully described and claimed.

In the accompanying drawings, Figure 1 is a plan view of the running-gear of a vehicle constructed in accordance with my invention. Fig. 2 is a central longitudinal section of the same, and Fig. 3 is a front view.

In the said drawings, the reference-numeral 1 designates the axles, which may be of any ordinary or suitable construction, while the numeral 2 denotes a spring, which is what is termed a "leaf-spring," being composed of a number of steel plates which gradually decrease in length. This spring is secured to the rear axle by means of a loose clip or loop 3, while its forward end is attached to a rearwardly-projecting tongue $3^a$ by means of a loop similar to loop 3.

The numeral 4 designates two U-shaped springs of suitable material, the ends of which are formed with eyes 5, which are clipped to the ends of the semi-elliptic springs $5^a$, secured at their centers to the head-block, hereinafter described, and the rear axle, respectively. These springs extend inwardly from the axles to near the center of the vehicle, where they are rigidly attached to the spring 2 by means of box-loops and clips 6.

The numeral 7 designates two reach-bars, rigidly secured to the hind axle and extending diagonally forward, where their front ends are rigidly secured to the tongue $3^a$. These reach-bars are also secured to the head-block 8 by means of two depending arms $8^a$. The front axle is pivoted between the tongue $3^a$ and the head-block by means of king-bolt $8^b$.

The numerals 9 9 denote two transverse rods secured to the springs 4, to which the vehicle-body is secured.

12 12 designate brace-rods secured to the hind axle and reach-bars, respectively.

From the above it will be seen that the inwardly-projecting springs are connected with semi-elliptic springs secured to the axle, whereby a combined torsional and resilient effect is obtained.

Having thus described my invention, what I claim is—

1. In a running-gear for vehicles, the combination, with the axles, the central spring loosely connected therewith, and the semi-elliptic springs, of the inwardly-projecting springs clipped to the ends of the semi-elliptic springs and secured to the central spring and provided with transverse bars to which the vehicle-body is secured, and the diagonal reach-bars connected with the axles, substantially as described.

2. In a running-gear, the combination, with the axles, the head-block, the central spring, the semi-elliptic springs, and the inwardly-projecting springs provided with transverse bars, of the diagonal reach-bars rigidly connected with the hind axle, the rearwardly-extending tongue connected with said bars and with the head-block, the depending arms connecting the reach-bars with the head-block, and the king-bolt, substantially as described.

In testimony that I claim the foregoing as my own I have hereunto affixed my signature in presence of two witnesses.

JOHN W. PATTERSON.

Witnesses:
C. M. BOURLAND,
JOHN W. REEDER.